United States Patent
Li et al.

(10) Patent No.: US 8,432,916 B2
(45) Date of Patent: Apr. 30, 2013

(54) METHOD AND ROUTER FOR IMPLEMENTING MIRRORING

(75) Inventors: Ning Li, Guangdong Province (CN); Xi Yang, Guangdong Province (CN); Qing Wang, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 28 days.

(21) Appl. No.: 13/258,002

(22) PCT Filed: Aug. 24, 2009

(86) PCT No.: PCT/CN2009/073460
§ 371 (c)(1),
(2), (4) Date: Dec. 6, 2011

(87) PCT Pub. No.: WO2010/142088
PCT Pub. Date: Dec. 16, 2010

(65) Prior Publication Data
US 2012/0082162 A1 Apr. 5, 2012

(30) Foreign Application Priority Data
Jun. 11, 2009 (CN) .......................... 2009 1 0147320

(51) Int. Cl.
*H04L 12/28* (2006.01)

(52) U.S. Cl.
USPC ......................................................... 370/392

(58) Field of Classification Search .................. 370/392
See application file for complete search history.

(56) References Cited

U.S. PATENT DOCUMENTS

| 2006/0005074 A1 | 1/2006 | Yanai et al. | |
|---|---|---|---|
| 2007/0127473 A1* | 6/2007 | Kessler et al. | 370/390 |
| 2009/0213867 A1* | 8/2009 | Devireddy et al. | 370/419 |
| 2011/0125894 A1* | 5/2011 | Anderson et al. | 709/224 |

FOREIGN PATENT DOCUMENTS
CN 101068248 A 11/2007

OTHER PUBLICATIONS

Wangchao, information Compiling for Switch Port Mirroring (Version 3), [online], Jul. 2008.
International Search Report for PCT/CN2009/073460 dated Jan. 20, 2010.

* cited by examiner

*Primary Examiner* — Sulaiman Nooristany
(74) *Attorney, Agent, or Firm* — Ling Wu; Stephen Yang; Ling and Yang Intellectual Property

(57) ABSTRACT

A method and router for implementing mirroring, said method including: configuring a remote mirroring port on a source router, establishing a corresponding layer two virtual interface, and specifying a data stream requiring mirroring and a corresponding physical egress port; establishing a layer two virtual interface corresponding to the layer two virtual interface of said source router on a destination router; forming one VPWS tunnel between the layer two virtual interfaces of said source router and said destination router; filtering out the mirroring data stream from the packet received at the remote mirroring port of said source router, and sending obtained mirroring packet from the physical egress port on said source router to said destination router; searching the layer two virtual interface on said destination router after receiving mirroring packet, and sending mirroring packet without a label from its corresponding physical port to a monitoring port, thereby implementing router remote mirroring.

12 Claims, 5 Drawing Sheets

METHOD AND ROUTER FOR IMPLEMENTING MIRRORING

TECHNICAL FIELD

The present invention relates to the mirroring technique, and particularly, to a method and router for implementing mirroring.

BACKGROUND OF THE RELATED ART

In a circumstance of the Ethernet, generally the communication between two workstations will not be intercepted by the third party, but in certain cases, all the data packets passing in and out the network possibly require to be monitored for the management server installed with the monitor software to catch data, for example the Internet bar should provide this function to send the data to the public security department to be examined; however, enterprises also urgently need one port in the network to provide this real-time monitor function to secure the information security and to keep the company secrets.

The port mirroring function in the enterprise is able to well carry out the monitor management on the network data inside the enterprise, and when a fault occurs in the network, the fault positioning can be done well; however, monitoring all the traffic is rather difficult in the current widespread used switching network, and therefore a switch/router requires to be configured to forward the data of one or more ports to a certain port to implement the monitoring for the network.

The port mirroring function is able to copy part or all traffic of one port (source port) to another specified port called as a "mirroring port" (also called as a "monitoring port" or a "destination port"); in the case of not severely affecting the normal throughput of the source port, the traffic of the network is monitored and analyzed through the mirroring port; the existing port mirroring techniques implemented on the routers are all based on the router itself, namely one or more ports on the router are mirrored to another port on this router, and since the remote monitor of the port is not implemented, its application scope is limited.

With the wide application of the Virtual Private Network (VPN) technique, the application areas of the router become wider and wider, and more and more services have been implemented, and along with the rising of the awareness of their own network security of each enterprise, the demands for remote monitoring and interception become more and more urgent, however, there is not a particular implementation scheme yet.

SUMMARY OF THE INVENTION

The technical problem to be solved in the present invention is to provide a method for implementing remote mirroring and a router for supporting to implement the remote mirroring, which enable the traffic monitoring to be implemented in different places.

In order to solve the above problem, the present invention provides a method for implementing mirroring, and this method comprises following steps:

A. configuring a remote mirroring port on a source router, establishing a corresponding layer two virtual interface for said remote mirroring port, specifying a data stream requiring mirroring and a physical egress port corresponding to said layer two virtual interface for said layer two virtual interface, and the data stream requiring mirroring namely being a mirroring data stream; establishing a layer two virtual interface corresponding to the layer two virtual interface of said source router on a destination router, and specifying a corresponding physical egress port for said layer two virtual interface on said destination router; the layer two virtual interface on said source router and the layer two virtual interface on said destination router forming one Virtual Private Wire Service (VPWS) tunnel;

B. after receiving a packet, the remote mirroring port of said source router filtering out the mirroring data stream from said packet, obtaining a mirroring packet according to the mirroring data stream, and sending said mirroring packet from the physical egress port corresponding to the layer two virtual interface on said source router to said destination router;

C. after receiving the mirroring packet, said destination router searching the layer two virtual interface on said destination router corresponding to the layer two virtual interface on said source router, and sending a mirroring packet with the label being removed from a physical port corresponding to the layer two virtual interface on said destination router to a monitoring port, thereby the above method implements the remote mirroring of a router.

Furthermore, when the remote mirroring port is configured on the source router, this method further comprises: configuring a port attribute list for the remote mirroring port of said source router, the port attribute list of the remote mirroring port on said source router including a mirroring flag and an egress interface for mirroring, and said egress interface being the layer two virtual interface on said remote mirroring port of said source router;

the physical egress port corresponding to the layer two virtual interface on said source router is included in the port attribute list configured for the layer two virtual interface on said source router when the corresponding layer two virtual interface is established for said remote mirroring port, and the port attribute list of the layer two virtual interface on said source router further includes an Access Control List (ACL) rule number and an ID number of said VPWS tunnel;

when the layer two virtual interface corresponding to the layer two virtual interface on the source router is established on the destination router, this method further comprises: establishing a VPWS forwarding list for said VPWS tunnel on said source router, and said VPWS forwarding list including a Virtual Private Network (VPN) ID of said VPWS tunnel, a source MAC, a destination MAC and inner and outer label information of said VPWS tunnel.

Furthermore, said step B comprises:

after receiving said packet, the remote mirroring port of the source router searching the port attribute list of said remote mirroring port to obtain the layer two virtual interface of the remote mirroring port of said source router, then searching the port attribute list of the layer two virtual interface on said source router, filtering out the mirroring data stream according to the ACL rule in the port attribute list, obtaining the source MAC, destination MAC and inner and outer label information of said VPWS tunnel according to said VPWS forwarding list, encapsulating the source MAC, destination MAC and inner and outer labels into a layer two header of said mirroring data stream, obtaining said mirroring packet, and then sending said mirroring packet from the physical egress port corresponding to the layer two virtual interface on said source router to the destination router.

Preferably, when the layer two virtual interface corresponding to the layer two virtual interface of said source router is established on the destination router, this method further comprises:

configuring a port attribute list for the layer two virtual interface on said destination router, and the port attribute list of the layer two virtual interface on said destination router including a practical physical egress port corresponding to the layer two virtual interface on said destination router; and establishing a Multi protocol Label Switching (MPLS) forwarding list for a port on the destination router on which the mirroring packet is received, and said MPLS forwarding list including an egress interface corresponding to an inner layer Virtual Circuit (VC) label, and said egress interface is the layer two virtual interface corresponding to the layer two virtual interface of the source router.

Preferably, said step C comprises:

a port of said destination router searching a MPLS forwarding list of the port for receiving said mirroring packet after receiving said mirroring packet, obtaining an egress interface corresponding to an inner layer VC label which namely is an established layer two virtual interface, searching a port attribute list of the layer two virtual interface on the destination router to obtain the physical egress port corresponding to the layer two virtual interface on said destination router, and then sending said mirroring packet with the label being removed from the physical egress port corresponding to the layer two virtual interface on said destination router to the monitoring port.

Furthermore, the remote mirroring port of said source router is an ingress port and/or an egress port of the source router.

Furthermore, when the remote mirroring port of said source router is the ingress port, after said step B, this method further comprises: transmitting said mirroring packet back to the ingress port, and then forwarding the mirroring packet as a common packet;

when the remote mirroring port of said source router is the egress port, in the step B, after the step of the packet being received at the remote mirroring port of said source router and before the step of filtering out the mirroring data stream, this method further comprises: forwarding said packet as the common packet, and then transmitting said packet back to the egress port.

The present invention further provides a method for implementing remote mirroring, wherein a remote mirroring port is configured on a source router, a corresponding layer two virtual interface is established for said remote mirroring port and a data stream requiring mirroring and a physical egress port are specified for said layer two virtual interface; a layer two virtual interface corresponding to the layer two virtual interface of said source router is established on a destination router, and one Virtual Private Wire Service (VPWS) tunnel is formed between the layer two virtual interface on said source router and the layer two virtual interface on said destination router;

a data stream requiring mirroring is filtered out from the packet received by the remote mirroring port of said source router, and is sent from the physical egress port corresponding to said layer two virtual interface to said destination router;

said destination router searches the corresponding layer two virtual interface after receiving the mirroring packet, and sends a mirroring packet with the label being removed from a physical port corresponding to this layer two virtual interface to a monitoring port.

Furthermore, a port attribute list is configured for the remote mirroring port of said source router, which includes a mirroring flag and an egress interface for mirroring, and said egress interface is the established layer two virtual interface; the port attribute list is also configured for said layer two virtual interface, which includes a practical physical egress port corresponding to this layer two virtual interface, an Access Control List (ACL) rule number and an ID number of said VPWS tunnel; and a VPWS forwarding list is also configured for said VPWS tunnel at said source router, which includes an ID number of said VPWS tunnel, a source MAC, a destination MAC and inner and outer label information of said tunnel;

after the packet is received at one physical port of the source router, it is judged whether this port is the remote mirroring port, and if yes, the port attribute list of said physical port is searched to obtain the layer two virtual interface of the remote mirror, then the port attribute list of the layer two virtual interface is searched, the mirroring data stream is filtered out according to the ACL rule in the port attribute list, the source MAC, destination MAC and inner and outer label information of the VPWS tunnel are obtained according to corresponding VPWS forwarding list, the source MAC, destination MAC and inner and outer labels are encapsulated into a layer two header of said mirroring data stream, and then the encapsulated mirroring packet is sent from the physical egress port corresponding to the layer two virtual interface to the destination router.

Furthermore, a Multi protocol Label Switching (MPLS) forwarding list is established for a port at which the mirroring packet is received on the destination router, wherein an egress interface corresponds to an inner layer VC label, and said egress interface is the layer two virtual interface corresponding to the layer two virtual interface of the source router, and a port attribute list for the layer two virtual interface is further configured on said destination router, which includes a practical physical egress port corresponding to this layer two virtual interface;

after a label packet is received at a physical port of the destination router, the MPLS forwarding list of this port is searched to obtain the egress interface corresponding to the inner layer VC label, and if the egress interface is the layer two virtual interface, it is a remote mirroring packet, and the port attribute list of said layer two virtual interface is searched to obtain the physical egress port, and then the label packet with the label being removed is sent to the monitoring port.

Furthermore, said configured remote mirroring port is an ingress port and/or an egress port of the source router.

Furthermore, for the source router, if the ingress port is the remote mirroring port, after receiving the packet, said ingress port transmits the packet back to the ingress port after carrying out the remote mirroring, and then the packet is forwarded as a common packet;

if the egress port is the remote mirroring port, after receiving the packet, said egress port firstly forwards said packet as a common packet and then transmits the packet back to the egress port after receiving the packet, and then carries out the remote mirroring.

The present invention further provides a router to support implementing mirroring, wherein said router comprises a configuration module, a support module, an access control module and a transceiver module, wherein when said router acts as a source router:

said configuration module is configured to configure a remote mirroring port, and establish a corresponding layer two virtual interface for said remote mirroring port;

said support module is configured to specify a mirroring data stream and a physical egress port corresponding to said layer two virtual interface of said source router for the layer two virtual interface on said source router;

said transceiver module is configured to forward a packet to the access control module after said packet is received at the remote mirroring port of said source router, obtain a mirroring packet according to the mirroring data stream after receiving the mirroring data stream returned by the access control module, and send said mirroring packet from the physical egress port corresponding to the layer two virtual interface on said source router to the destination router;

said access control module is configured to filter out a data stream which requires remote mirroring after receiving the packet, and return the data stream which requires remote mirroring to said transceiver module;

when said router acts as a destination router:

said configuration module is configured to establish a layer two virtual interface corresponding to the layer two virtual interface of said source router;

said support module is configured to specify a corresponding physical egress port for said layer two virtual interface established by said configuration module;

said transceiver module is configured to search the layer two virtual interface on said destination router corresponding to the layer two virtual interface on said source router after receiving the mirroring packet, and send a mirroring packet with the label being removed from a physical port corresponding to the layer two virtual interface on said destination router to a monitoring port, thereby said router implements supporting remote mirroring of the router.

Wherein said router further comprises: a storage device;

when said router acts as the source router, said support module is further configured to configure a port attribute list for said remote mirroring port, the port attribute list of the remote mirroring port on said source router includes a mirroring flag and an egress interface for remotely mirroring, and said egress interface is the layer two virtual interface on said remote mirroring port; the physical egress port corresponding to the layer two virtual interface on said source router is included in the port attribute list configured for the layer two virtual interface on said source router by said support module, and the port attribute list of the layer two virtual interface on said source router further includes an Access Control List (ACL) rule number and an ID number of a VPWS tunnel; said support module is further configured to configure a VPWS forwarding list for said VPWS tunnel on said source router, and said VPWS forwarding list includes a VPN ID of said VPWS tunnel, a source MAC, a destination MAC and inner and outer label information of said VPWS tunnel; said support module is further configured to send the port attribute list of the remote mirroring port, the port attribute list of the layer two virtual interface and the VPWS forwarding list configured on said source router to said storage device;

said storage device is configured to receive and store the port attribute list of the remote mirroring port, the port attribute list of the layer two virtual interface and the VPWS forwarding list on said source router.

Furthermore, said transceiver module includes: a remote mirroring unit;

when said router acts as the source router, said transceiver module is further configured to forward the data stream which requires remote mirroring returned by the access control module to the remote mirroring unit; said transceiver module is further configured to receive said mirroring packet returned by said remote mirroring unit;

said remote mirroring unit is configured to search the port attribute list of said remote mirroring port to obtain the layer two virtual interface of the remote mirroring port of said source router after receiving data stream which requires remote mirroring, then search the port attribute list of the layer two virtual interface on said source router, filter out the mirroring data stream according to the ACL rule in the port attribute list, obtain the source MAC, destination MAC and inner and outer label information of said VPWS tunnel according to said VPWS forwarding list, encapsulate the source MAC, destination MAC and inner and outer labels into a layer two header of said mirroring data stream, obtain said mirroring packet, and then send said mirroring packet from the physical egress port corresponding to the layer two virtual interface on said source router to said transceiver module.

Preferably, said router further comprises: a storage device;

when said router acts as the source router, said support module is further configured to configure a port attribute list for the layer two virtual interface on said destination router, and the port attribute list of the layer two virtual interface on said destination router includes a practical physical egress port corresponding to the layer two virtual interface on said destination router; said support module is further configured to establish a Multi protocol Label Switching (MPLS) forwarding list for a port at which the mirroring packet is received on the destination router, and said MPLS forwarding list includes an egress interface corresponding to an inner layer Virtual Circuit (VC) label, and said egress interface is the layer two virtual interface corresponding to the layer two virtual interface of the source router; said support module is further configured to send the MPLS forwarding list and the port attribute list of the layer two virtual interface configured on said destination router to said storage device;

said storage device is further configured to receive and store the MPLS forwarding list and the port attribute list of the layer two virtual interface on said destination router.

Preferably, said transceiver module further includes: a remote mirroring unit;

when said router acts as the destination router, said transceiver module is further configured to receive said mirroring packet, search the MPLS forwarding list of the port at which said mirroring packet is received, obtain the egress interface corresponding to the inner layer VC label, this egress interface being the layer two virtual interface on said destination router, and send said mirroring packet and layer two virtual interface information to said remote mirroring unit; and said transceiver module is further configured to receive a mirroring packet with the label being removed from said remote mirroring unit, and said mirroring packet with the label being removed is a layer three packet;

said remote mirroring unit is configured to search the port attribute list of said layer two virtual interface on said destination router after receiving said mirroring packet and the layer two virtual interface information to obtain a physical egress port corresponding to the layer two virtual interface, and send the mirroring packet which the label is removed to said transceiver module.

Furthermore, when said router acts as the source router, the remote mirroring port configured by said configuration module is an ingress port and/or an egress port of the source router.

Furthermore, when said router acts as the source router, and when the remote mirroring port of said source router is the ingress port, said transceiver module is further configured to transmit said mirroring packet back to said ingress port after sending said mirroring packet from the physical egress port corresponding to the layer two virtual interface on said source router to said destination router, and then forward said mirroring packet as a common packet;

when the remote mirroring port of said source router is the egress port, said transceiver module is further configured to transmit said mirroring packet back to said egress port after forwarding said packet as the common packet after the packet is received at the remote mirroring port of said source router and before filtering out the mirroring data stream.

The present invention further provides a system for implementing remote mirroring, and the system comprises a source router and a destination router;

said source router comprises a configuration module, a support module, an access control module and a transceiver module, wherein the configuration module of said source router is configured to configure a remote mirroring port, and establish a corresponding layer two virtual interface for said remote mirroring port;

the support module of said source router is configured to specify a data stream requiring mirroring and a physical egress port for said layer two virtual interface;

the transceiver module of said source router is configured to forward a packet to the access control module after the packet is received at the remote mirroring port of said source router, and send a mirroring data stream from the physical egress port corresponding to the layer two virtual interface to said destination router after receiving said mirroring data stream returned by the access control module;

the access control module of said source router is configured to filter out the data stream which requires remote mirroring after receiving said packet, and return the mirroring data stream to said transceiver module;

said destination router comprises a configuration module, a support module and a transceiver module;

the configuration module of said destination router is configured to establish a layer two virtual interface corresponding to the layer two virtual interface of said source router;

the support module of said destination module is configured to specify a physical egress port for said layer two virtual interface;

the transceiver module of said destination router is configured to search the corresponding layer two virtual interface after receiving the mirroring packet, and send a mirroring packet with the label being removed from a physical port corresponding to this layer two virtual interface to a monitoring port.

Furthermore, said source router further comprises a storage device;

the support module of said source router is further configured to configure a port attribute list for said remote mirroring port, which includes a mirroring flag and an egress interface for remote mirroring, and said egress interface is the established layer two virtual interface;

the support module of said source router specifying the data stream requiring mirroring and the physical egress port for said layer two virtual interface refers that the support module of said source router configures a port attribute list for said layer two virtual interface, which includes the practical physical egress port corresponding to this layer two virtual interface, the access control list (ACL) rule number, and the VPN ID of the VPWS tunnel; the support module of said source router is further configured to configure a VPWS forwarding list for the VPWS tunnel, which includes the ID number of this VPWS tunnel, source MAC and destination MAC and the inner and outer label information of the tunnel; the support module of said source router is further configured to send the configured port attribute list of the remote mirroring port, the port attribute list of the layer two virtual interface and the VPWS forwarding list to said storage device;

the storage device of said source router is configured to receive and store the port attribute list of the remote mirroring port, the port attribute list of the layer two virtual interface and the VPWS forwarding list;

the transceiver module of said source router comprises: a remote mirroring unit;

the transceiver module of said source router is further configured to judge whether one physical port of said source router is the remote mirroring port after the packet is received at this port, and if yes, send the packet carrying the corresponding layer two virtual interface information to the access control module, and forward the mirroring data stream returned by the access control module carrying the corresponding layer two virtual interface information to the remote mirroring unit;

the transceiver module of said source router is further configured to send the encapsulated mirroring packet to the destination router from the physical egress port corresponding to said layer two virtual interface after receiving the encapsulated mirroring packet returned by said remote mirroring unit;

the remote mirroring unit of said source router is configured to search the port attribute list of the layer two virtual interface after receiving said mirroring data stream, search the corresponding VPWS forwarding list according to the ID number of the VPWS tunnel in the port attribute list, obtain the source MAC, destination MAC and inner and outer label information of the tunnel, encapsulate the source MAC, destination MAC and inner and outer labels into a layer two header of said mirroring data stream, and return the encapsulated mirroring packet to said transceiver module.

Furthermore, said destination router further comprises a storage device;

the support module of said destination router is further configured to establish a Multi protocol Label Switching (MPLS) forwarding list for a port receiving the mirroring packet, which includes an egress interface corresponding to an inner layer VC label, and said egress interface is the layer two virtual interface corresponding to the layer two virtual interface of the source router.

the support module of said destination router specifying the physical egress port for said layer two virtual interface refers that the support module of said destination router configures a port attribute list for the layer two virtual interface, which includes a practical physical egress port corresponding to the layer two virtual interface; and the support module of said destination router is further configured to send the configured MPLS forwarding list and the port attribute list of the layer two virtual interface to said storage device of said source router;

the storage device of said destination router is configured to receive and store the MPLS forwarding list and the port attribute list of the layer two virtual interface;

the transceiver module of said destination router includes a remote mirroring unit;

the transceiver module of said destination router is further configured to receive a label packet, search the MPLS forwarding list of the port at which this label packet is received to obtain an egress interface corresponding to an inner layer VC label, and if the egress interface is the layer two virtual interface, send this label packet and layer two virtual interface information to said remote mirroring unit; and this transceiver module is further configured to send a layer three packet after removing the label from the physical egress port corresponding to the layer two virtual interface;

the remote mirroring unit of said destination router is configured to search the port attribute list of said layer two virtual interface after receiving the label packet and the layer two virtual interface information to obtain a physical egress port corresponding to the layer two virtual interface, and send the label packet with the label being removed to said transceiver module.

Furthermore, the remote mirroring port configured by said configuration module of said source router is an ingress port and/or an egress port of the source router.

Furthermore, if the ingress port is the remote mirroring port, after the packet is received at said ingress port, said transceiver module of said source router is further configured to transmit said mirroring packet back to said ingress port after sending said packet to said remote mirroring unit to carry out the remote mirroring, and then forward said packet as a common packet;

if the egress port is the remote mirroring port, after the packet is received at said egress port, the transceiver module of said source router is further configured to forward said packet as the common packet at first before transmitting the packet to the remote mirroring unit to carry out the remote mirroring, and transmit said packet back to said egress port and then carry out the remote mirroring.

As a conclusion, the present invention provides a method and system for implementing remote mirroring, and part or all traffic on either the ingress port or the egress port on the router can all be mirrored to the remote monitoring port, namely, the traffic monitoring can be implemented in different places.

PREFERRED EMBODIMENTS OF THE PRESENT INVENTION

The present invention provides a method and router for implementing remote mirroring, and part or all traffic on either the ingress port or the egress port or both of the router can all be mirrored to the remote monitoring port according to the user's demands.

Figure 1:
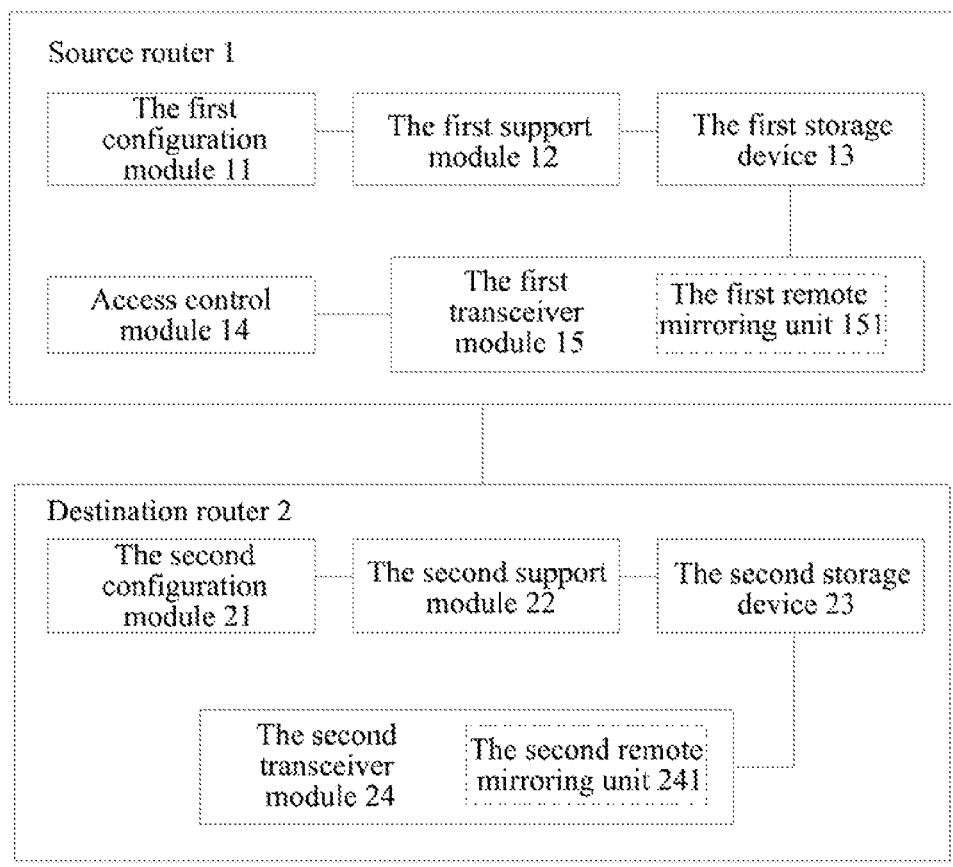
FIG. 1 is a schematic diagram of the system structure according to the present invention.

The present invention provides a system for implementing remote mirroring of a router, and as shown in FIG. 1, the system comprises a source router 1 and a destination router 2, wherein the source router 1 comprises the first configuration module 11, the first support module 12, the first storage device 13, an access control module 14 and the first transceiver module 15, and the first transceiver module 15 comprises: the first remote mirroring unit 151, wherein the first configuration module 11 is configured to receive a user command to configure the remote mirroring port of the source router 1, the configured remote mirroring port is an ingress port and/or an egress port; and the first configuration module 11 is also configured to establish a corresponding layer two virtual interface for the remote mirroring port, and configure a corresponding Access Control List (ACL) rule for the remote mirroring port according to the user command, namely specify the data stream which requires mirroring;

the first support module 12 is configured to establish, maintain and delete the port attribute list for the layer two virtual interface and the common physical interface, and establish, maintain and delete various types of related service list items such as the routing list, Multi Protocol Label Switching (MPLS) list, and Virtual Private Wire Service (VPWS) list on the router, which particularly refers to configure the port attribute list for the remote mirroring port; and also configured to configure the port attribute list for the layer two virtual interface; and also configured to configure a VPWS forwarding list for the Virtual Private Wire Service (VPWS) tunnel; and also configured to store the configured port attribute list of the remote mirroring port, the port attribute list of the layer two virtual interface and the VPWS forwarding list into the first storage device 13 in the source router 1.

Wherein the port attribute list of the remote mirroring port includes the port service required information (for example the port identifier), mirroring flag and the egress interface for mirroring, and this egress interface is the established layer two virtual interface.

The related information of the layer two virtual interface is stored in the port attribute list of the layer two virtual interface, including the practical physical egress port corresponding to this layer two virtual interface, the ACL rule number, and the VPN ID (namely the ID number of the VPWS tunnel).

The VPWS forwarding list includes the VPN ID of this VPWS tunnel, source MAC and destination MAC and the inner and outer label information of the tunnel.

The first storage device 13 is configured to store the port attribute list of the remote mirroring port, the port attribute list of the layer two virtual interface and the VPWS forwarding list.

The access control module 14 is configured to search the ACL rule number corresponding to this layer two virtual interface from the first storage device 13 after receiving the packet and layer two virtual interface information sent by the first transceiver module 15, filter out the data stream requiring mirroring according to the ACL rule, and return the filtered mirroring data stream to the first transceiver module 15;

the first transceiver module 15 is configured to receive the packet and judge whether the state of this packet is normal, and if it is abnormal, discard this packet, and if it is normal, then inquire the port attribute list of the port at which this packet is received in the first storage device 13, and send the received packet and the layer two virtual interface information (for example, it can be the layer two virtual interface identifier) in the first storage device 13 to the access control module 14 after determining that this port is the remote mirroring port; the transceiver module is further configured to send the mirroring data stream filtered by the access control module 14 and the layer two virtual interface information to the first remote mirroring unit 151, and then send the encapsulated mirroring packet returned by the first remote mirroring unit 151 to the network from the physical egress port corresponding to the layer two virtual interface; the first transceiver module 15 is further configured to judge whether the type of the remote mirroring port at which the packet is received is an ingress port or an egress port, and if it is the ingress port, the transceiver module is further configured to transmit the packet back to the ingress port after sending the packet to the first remote mirroring unit 151 to carry out the remote mirroring, and then forward the packet as the common packet; if it is the egress port, the transceiver module is further configured to forward the packet as the common packet before sending the packet to the first remote mirroring unit 151 to carry out the remote mirroring, and sending the packet to the remote mirroring unit 151 after transmitting the packet back to the egress port.

Herein the meaning of whether the packet is normal and judging whether the state of the packet is normal belong to the prior art, and will not be discussed any more.

The above step of judging whether this port is a remote mirroring port means firstly checking whether the mirroring flag exists in the port attribute list of the port at which this packet is received, and if exists, further checking the egress interface for mirroring, and if it is the layer two virtual interface, then this port is the remote mirroring port;

remote mirroring unit 151 belongs to a part of the first transceiver module 15, which is configured to search the port attribute list of this layer two virtual interface after receiving the mirroring data stream and layer two virtual interface information, search the corresponding VPWS forwarding list according to the VPN ID of the port attribute list of this layer two virtual interface, obtain the source MAC address and destination MAC address therefrom, obtain the inner and outer labels of this tunnel, and afterwards, encapsulate the source MAC address, destination MAC address and the inner and outer labels into the layer two header of the mirroring data stream; and also configured to return the encapsulated mirroring packet to the first transceiver module 15.

The destination router 2 comprises the second configuration module 21, the second support module 22, the second storage device 23 and the second transceiver module 24, and the second transceiver module 24 comprises the second remote mirroring unit 241, wherein the second configuration module 21 is configured to establish a layer two virtual interface corresponding to the layer two virtual interface of the source router 1;

the second support module 22 is configured to establish, maintain and delete the port attribute list for the layer two virtual interface and common physical interface, and establish, maintain and delete various types of related service list items such as the routing list, MPLS list and VPWS list on the router, which particularly refers to establishing the port attribute list for the layer two virtual interface corresponding to the layer two virtual interface of the source router 1; also configured to establish the MPLS forwarding list for the port at which the mirroring packet is received; the second support module 22 is also configured to store the established MPLS forwarding list and the port attribute list of the layer two virtual interface into the second storage device 23 of the destination router.

Wherein the port attribute list established for the layer two virtual interface includes the physical egress port information of the layer two virtual interface and the VPN ID, wherein the tunnel number of this VPN ID is the same with the tunnel number of the layer two virtual interface corresponding to the source router 1.

The MPLS forwarding list includes the egress interface corresponding to the inner layer Virtual Circuit (VC) label, and this egress interface is the established layer two virtual interface.

The second storage device 23 is configured to store the above MPLS forwarding list and the port attribute list of the layer two virtual interface.

The second transceiver module 24 is configured to receive the label packet, obtain the egress interface corresponding to the inner layer VC label according to the MPLS forwarding list of the port at which the label packet is received, and send this packet and layer two virtual interface information to the remote mirroring unit after determining that this egress interface is the layer two virtual interface; the transceiver module is further configured to send the layer three packet after removing the label from the physical egress port corresponding to the layer two virtual interface.

The second remote mirroring unit 241 is included in the second transceiver module 24, and is configured to search the port attribute list of this layer two virtual interface after receiving the label packet and layer two virtual interface information to obtain the physical egress port corresponding to the port attribute list, and send the label packet after removing the label to the second transceiver module 24.

The present invention further provides a router for supporting to implement the remote mirroring, and this router comprises the configuration module, support module, access control module and transceiver module, and when this router acts as the source router, the function of each module in this router is the same with the function of each module included in the above source router; and when this router acts as the destination router, the function of each module this router is the same with the function of each module included in the above destination router, and it will not be discussed any more herein.

The present invention further provides a method for implementing remote mirroring, comprises:

a configuration stage: configuring a remote mirroring port (the ingress port and/or egress port) on the source router, establishing the layer two virtual interface and the corresponding VPWS tunnel; also establishing the port attribute list for the remote mirroring port, and this port attribute list comprises the mirroring flag and the mirroring egress interface (namely the established layer two virtual interface); configuring the port attribute list for the layer two virtual interface, wherein the related information of this layer two virtual interface is stored in the attribute list, including the practical physical egress port corresponding to this layer two virtual interface, ACL rule number, and the ID number of the VPWS tunnel and so on; and also configuring the VPWS forwarding list for the VPWS tunnel, including the VPN ID of the VPWS tunnel, source MAC address, destination MAC address and inner and outer label information of the VPWS tunnel;

the use of the layer two virtual interface is the same with that of the common layer two port, and the layer two VPN service is enabled on the virtual interface, and herein the VPWS service is enabled; the port attribute list of the above layer two virtual interface is established with the establishment of the layer two virtual interface, and is deleted with the deletion of the layer two virtual interface.

The layer two virtual interface corresponding to the layer two virtual interface on the source router is established on the destination router, and one VPWS tunnel is formed between the layer two virtual interface on the source router and the layer two virtual interface on the destination router; the port attribute list also requires to be configured for the layer two virtual interface on the destination router, which includes the physical egress port information of the layer two virtual interface and the VPN ID (this tunnel number is the same with the tunnel number of the layer two virtual interface corresponding to the source router); and the MPLS forwarding list is generated for the physical port at which the remote mirroring packet is received, the MPLS forwarding list includes the egress interface corresponding to the inner layer VC label, and this egress interface is the above established layer two virtual interface.

Figure 2:
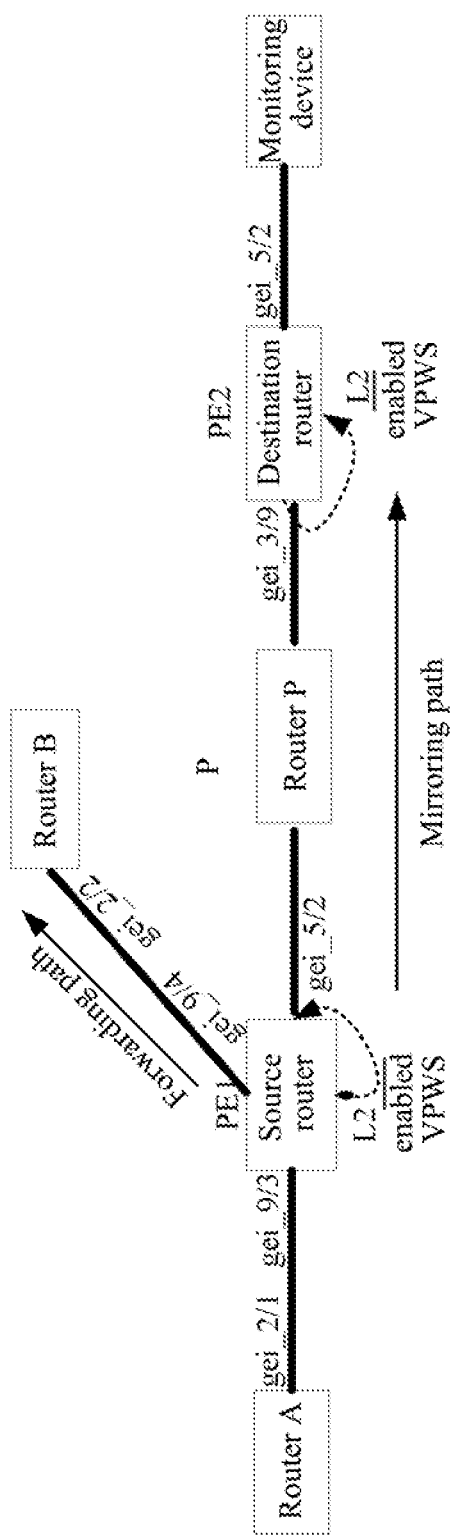
FIG. 2 is a schematic diagram of an application scenario of the remote mirroring according to the present invention.

Different VPWS tunnels can be established on the source router and the destination router, and its flexibility satisfies to monitor a plurality of different traffics; FIG. 2 shows the diagram of the practical networking model of the present invention, and the L2, namely the level 2 in FIG. 2, denotes the layer two forwarding, and indicates that here it is the layer two transparent transmission, namely that the information of the layer three header is not used during the whole mirroring packet transmission. The Provider (P) router in FIG. 2 is located in the backbone network, and is responsible for establishing the label switching path, and forwarding data packet in a way of the label switching, and the Customer Edge (CE) device can be the router, and also can be the switch or host; the Provider Edge (PE) router is located in the backbone network, and is the border of the P and CE. The gei__9/3, gei__5/2 and gei__9/4 and so on denote different ports. When the mirroring source port and the destination port are on the different routers, the port traffic on the source router can be mirrored to the destination port on the destination router. The main concept of the remote mirroring is to use the layer two virtual interface and the VPWS tunnel to implement the transparent transmission of the packet. The mirroring source port is the gei__9/3 on the PE1 at the remote ingress mirroring side, and egress of the transparent transmission of the mirroring layer two virtual interface is the gei__5/2 on the PE2; the mirroring source port is the gei__9/4 on the PE1 at the remote egress mirroring side, and the egress of the transparent transmission of the mirroring layer two virtual interface is the gei__5/2 on the PE2.

Figure 3:
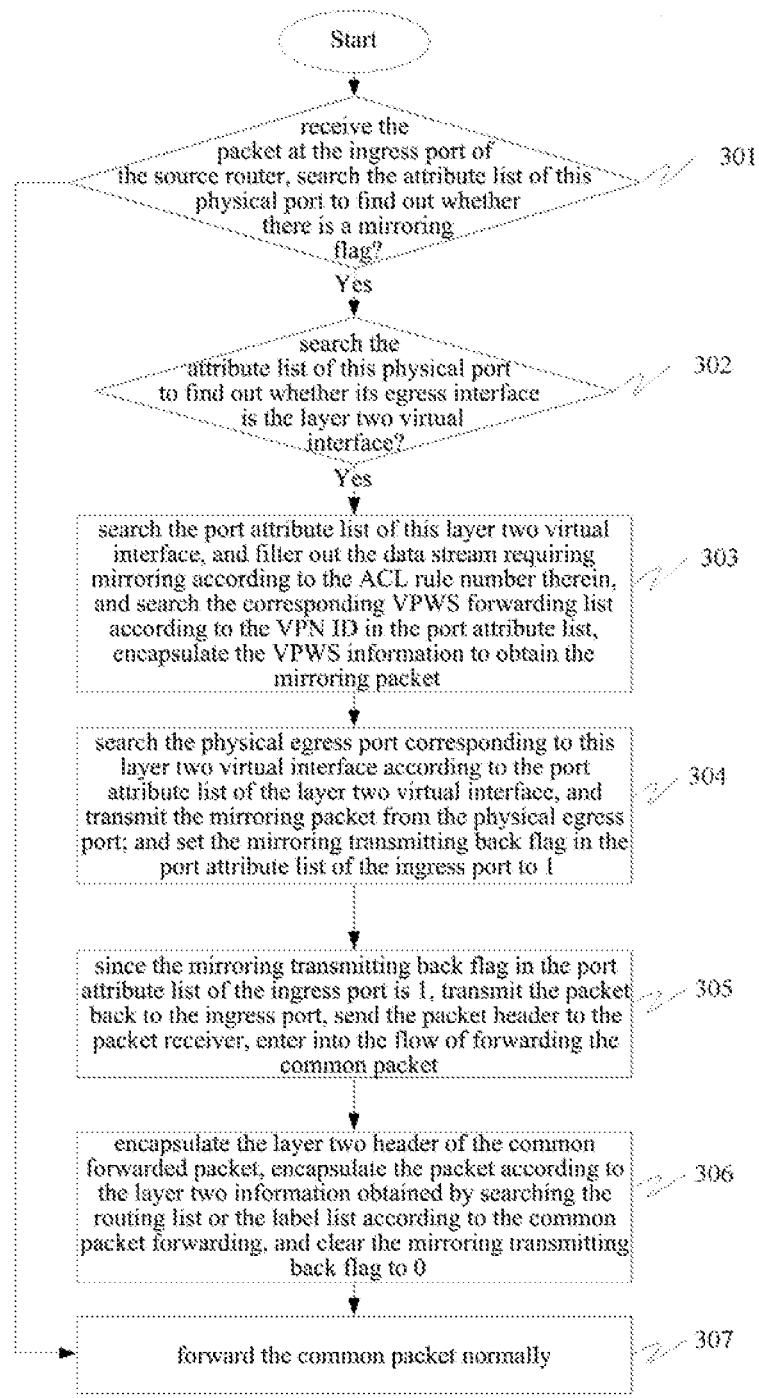
FIG. 3 is a flow chart for implementing remote mirroring at the ingress port in the source router according to the present invention.

The flow of mirroring the received packet is as follows:

FIG. 3 shows the flow chart of remotely mirroring the ingress port packet on the source router according to the present invention.

Step 301, receiving the packet at the ingress port (the physical interface) of the source router, searching the attribute list of this physical port to find out whether there is a mirroring flag, and if yes, step 302 is carried out, or else step 307 is carried out;

step 302, searching the attribute list of this physical port to obtain its egress interface, and if this egress interface is the established layer two virtual interface, denoting that the remote mirroring is required, and performing step 303, or else denoting that the local mirroring is required, and then forwarding the packet according to the local mirroring flow;

step 303, searching the port attribute list of this layer two virtual interface, and filtering out the data stream requiring mirroring, namely the mirroring data stream, according to the ACL rule number therein, and searching the corresponding VPWS forwarding list according to the VPN ID in the port attribute list of the layer two virtual interface, obtaining the mirroring packet according to the mirroring data stream and this VPWS forwarding list, and then performing step 304;

obtaining the mirroring packet according to the mirroring data stream and this VPWS forwarding list refers to obtaining the inner and outer labels of this VPWS tunnel, the source MAC address and destination MAC address from the VPWS forwarding list, and then encapsulating the source MAC address, destination MAC address and inner and outer labels into the layer two header of the mirroring data stream.

Step 304, searching the physical egress port corresponding to this layer two virtual interface according to the port attribute list of the layer two virtual interface, and transmitting the mirroring packet encapsulating the VPWS information from the physical egress port to the destination router through the VPWS tunnel; and setting the mirroring transmitting back flag in the port attribute list of the ingress port to 1;

Step 305, since the mirroring transmitting back flag in the port attribute list of the ingress port is 1, not releasing the packet stored in the storage device of the source router, but transmitting the packet back to the ingress port, sending the packet header to the packet receiver, proceeding the flow of forwarding the common packet, reducing the time of repeatedly reading and writing the slow external storage device, which can obviously improve the forwarding performance in the case of requiring processing the packet in a high speed;

step 306, encapsulating the layer two header of the common forwarded packet, encapsulating the packet according to the layer two information obtained by searching the routing list or the label list according to the common packet forwarding, and clearing the mirroring transmitting back flag to 0;

step 307, forwarding the common packet normally.

Figure 4:
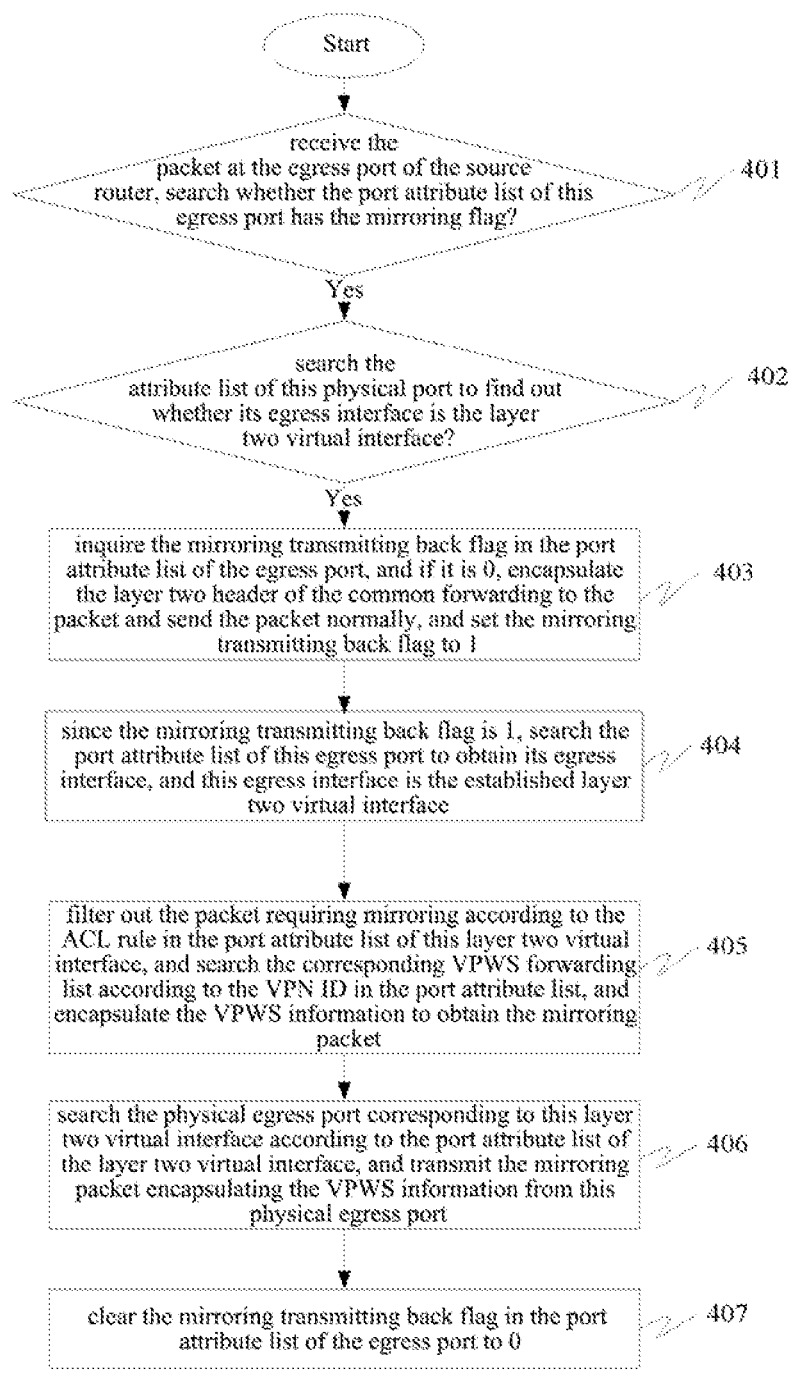
FIG. 4 is a flow chart for implementing remote mirroring at the egress port in the source router according to the present invention.

FIG. 4 shows the flow chart of implementing remote minoring for the packet of the egress port on the source router according to the present invention.

Step 401, receiving the packet at the egress port of the source router, inquiring whether the port attribute list of this egress port has the mirroring flag, and if yes, performing step 402, or else forwarding this packet according to the flow of the common forwarding;

Step 402, searching the attribute list of this physical port to obtain its egress interface, and judging whether it is local mirroring or remote mirroring according to the egress interface information (if the egress interface is the layer two virtual interface, then it is the remote mirroring, or else it is the local mirroring), and if it is the remote mirroring, performing step 403, or else carrying out the flow of the local mirroring.

Wherein the flow of the local minoring is the prior art, and herein it will not be repeated any more;

step 403, inquiring the minoring transmitting back flag in the port attribute list of the egress port, and if it is 0, encapsulating the layer two header of the common forwarding to the packet and sending the packet normally, and setting the minoring transmitting back flag to 1;

step 404, since the mirroring transmitting back flag is 1, transmitting the packet back to the egress port, and therefore not releasing immediately the packet stored externally, and searching the port attribute list of this egress port to obtain its egress interface after sending the common packet, and this egress interface being the established layer two virtual interface, and carrying out the step 405;

Step 405, filtering out the packet requiring mirroring according to the ACL rule in the port attribute list of this layer two virtual interface, and searching the corresponding VPWS forwarding list according to the VPN ID in the port attribute list, and encapsulating the VPWS information to obtain the minoring packet, and then performing step 406;

encapsulating the VPWS information to obtain the minoring packet refers to obtaining the inner and outer labels of the VPWS tunnel, source MAC address and the MAC address in the VPWS forwarding list, and then encapsulating the source and destination MAC addresses and the inner and outer labels into the layer two header of the packet;

step 406, searching the physical egress port corresponding to this layer two virtual interface according to the port attribute list of the layer two virtual interface, and transmitting the mirroring packet encapsulating the VPWS information from this physical egress port to the destination router through the VPWS tunnel;

step 407, clearing the mirroring transmitting back flag in the port attribute list of the egress port to 0 for use by the next packet forwarding, and the default value of the mirroring transmitting back flag being 0.

Figure 5:
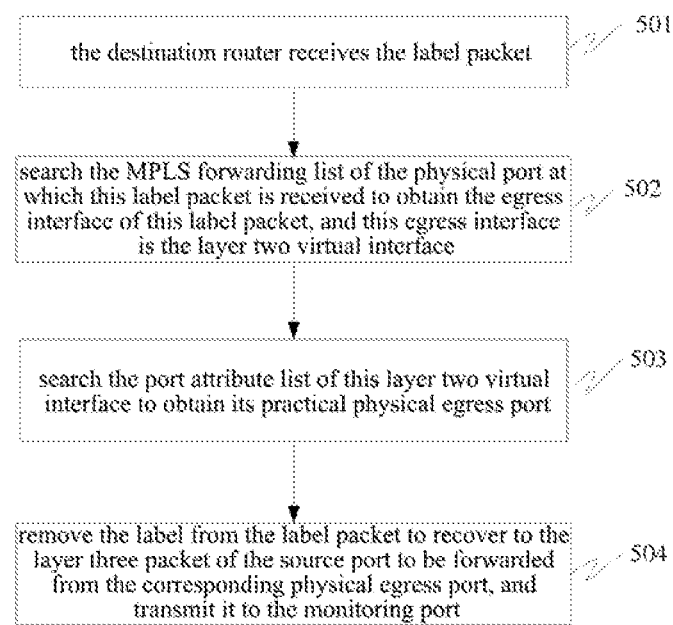
FIG. 5 is a flow chart for the destination router receiving the mirror traffic according to the present invention.

FIG. 5 shows a flow chart of processing the remote mirroring packet on the destination router according to the present invention.

Step 501, the destination router receiving the label packet, and the router not knowing that the received label packet is the mirroring packet at this time, and entering into the flow of forwarding the common label packet;

step 502, searching the MPLS forwarding list of the physical port at which this packet is received to obtain the egress interface of this label packet, and obtaining the egress interface of this label packet, and knowing that this egress interface is the layer two virtual interface according to the flag bit, and hence entering the flow of receiving the remote mirroring for the packet;

step 503, searching the port attribute list of this layer two virtual interface to obtain its practical physical egress port;

step 504, removing the label from the label packet by the label packet to recover to the layer three packet of the source port to be forwarded from the corresponding physical egress port, and transmitting it to the monitoring port, namely the port of the monitoring device.

The user configures the command through the configuration module, and can select to configure the remote mirroring at the ingress port, egress port or both, and can specify the data stream requiring mirroring, and the mirroring processing is completed in the forwarding process.

Industrial Applicability

In the method and system for implementing remote mirroring provided in the present invention, part or all traffic on either the ingress port or the egress port or both on the router can be mirrored to the remote monitoring port according to the user's demand, namely, the traffic monitoring can be implemented in different places, and therefore the present invention has strong industrial applicability.

What is claimed is:

1. A method for implementing mirroring, comprising following steps:
  A. configuring a remote mirroring port on a source router, establishing a corresponding layer two virtual interface for said remote mirroring port, specifying a data stream requiring mirroring and a physical egress port corresponding to said layer two virtual interface for said layer two virtual interface, and the data stream requiring mirroring namely being a mirroring data stream; establishing a layer two virtual interface corresponding to the layer two virtual interface of said source router on a destination router, and specifying a corresponding physical egress port for said layer two virtual interface on said destination router; forming one Virtual Private Wire Service (VPWS) tunnel between the layer two virtual interface on said source router and the layer two virtual interface on said destination router;
  B. after receiving packet at the remote mirroring port of said source router, filtering out the mirroring data stream from said packet, obtaining mirroring packet according to the mirroring data stream, and sending said mirroring packet from the physical egress port corresponding to the layer two virtual interface on said source router to said destination router;
  C. after receiving the mirroring packet, said destination router searching the layer two virtual interface on said destination router corresponding to the layer two virtual interface on said source router, and sending the mirroring packet with a label being removed from a physical port corresponding to the layer two virtual interface on said destination router to a monitoring port;
  when the remote mirroring port is configured on the source router, this method further comprises: configuring a port attribute list for the remote mirroring port of said source router, the port attribute list of the remote mirroring port on said source router including a mirroring flag and an egress interface for mirroring, and said egress interface being the layer two virtual interface on said remote mirroring port of said source router;
  the physical egress port corresponding to the layer two virtual interface on said source router is included in the port attribute list configured for the layer two virtual interface on said source router when the corresponding layer two virtual interface is established for said remote mirroring port, and the port attribute list of the layer two virtual interface on said source router further includes an Access Control List (ACL) rule number and an ID number of said VPWS tunnel;
  when the layer two virtual interface corresponding to the layer two virtual interface on the source router is established on the destination router, this method further comprises: establishing a VPWS forwarding list for said VPWS tunnel on said source router, and said VPWS forwarding list including a Virtual Private Network (VPN) ID of said VPWS tunnel, a source MAC, a destination MAC and inner and outer label information of said VPWS tunnel.

2. The method as claimed in claim 1, wherein said step B comprises:
  after receiving said packet at the remote mirroring port of the source router, searching the port attribute list of said remote mirroring port to obtain the layer two virtual interface of the remote mirroring port of said source router, then searching the port attribute list of the layer two virtual interface on said source router, filtering out the mirroring data stream according to the ACL rule in the port attribute list, and obtaining the source MAC, destination MAC and inner and outer label information of said VPWS tunnel according to said VPWS forwarding list, encapsulating the source MAC, destination MAC and inner and outer labels into a layer 2 packet header of said mirroring data stream, obtaining said mirroring packet, and then sending said mirroring packet from the physical egress port corresponding to the layer two virtual interface on said source router to the destination router.

3. The method as claimed in claim 2, wherein said step C comprises
  after receiving said mirroring packet at a port of said destination router, searching a MPLS forwarding list of the port at which said mirroring packet is received, obtaining an egress interface corresponding to an inner layer VC label, and this egress interface namely being an established layer two virtual interface, searching a port attribute list of the layer two virtual interface on the destination router to obtain the physical egress port corresponding to the layer two virtual interface on said destination router, and then sending said mirroring packet with the label being removed from the physical egress port corresponding to the layer two virtual interface on said destination router to the monitoring port.

4. The method as claimed in claim 1, wherein
  when the layer two virtual interface corresponding to the layer two virtual interface of said source router is established on the destination router, this method further comprises:
  configuring a port attribute list for the layer two virtual interface on said destination router, and the port attribute list of the layer two virtual interface on said destination router including a practical physical egress port corresponding to the layer two virtual interface on said destination router; and
  establishing a Multi protocol Label Switching (MPLS) forwarding list for a port at which the mirroring packet is received on the destination router, and said MPLS forwarding list including an egress interface corresponding to an inner layer Virtual Circuit (VC) label, and said egress interface is the layer two virtual interface corresponding to the layer two virtual interface of the source router.

5. The method as claimed in claim 1, wherein
the remote mirroring port of said source router is an ingress port and/or an egress port of the source router.

6. The method as claimed in claim 5, wherein
when the remote mirroring port of said source router is the ingress port, after said step B, this method further comprises: transmitting said mirroring packet back to the ingress port, and then forwarding the mirroring packet as common packet;
when the remote mirroring port of said source router is the egress port, in the step B, after the step of the packet being received at the remote mirroring port of said source router and before the step of filtering out the mirroring data stream, this method further comprises:
forwarding said packet as the common packet, and then transmitting said packet back to the egress port.

7. A router for implementing mirroring, comprising a configuration module, a support module, an access control module and a transceiver module, wherein when said router acts as a source router:
said configuration module is configured to configure a remote mirroring port, and establish a corresponding layer two virtual interface for said remote mirroring port;
said support module is configured to specify a mirroring data stream and a physical egress port corresponding to said layer two virtual interface of said source router for the layer two virtual interface on said source router;
said transceiver module is configured to forward packet to the access control module after said packet is received at the remote mirroring port of said source router, obtain mirroring packet according to the mirroring data stream after receiving the mirroring data stream returned by the access control module, and send said mirroring packet from the physical egress port corresponding to the layer two virtual interface on said source router to a destination router;
said access control module is configured to filter out a data stream which requires remote mirroring after receiving the packet, and return the data stream which requires remote mirroring to said transceiver module;
when said router acts as a destination router:
said configuration module is configured to establish a layer two virtual interface corresponding to the layer two virtual interface of said source router;
said support module is configured to specify a corresponding physical egress port for said layer two virtual interface established by said configuration module;
said transceiver module is configured to search the layer two virtual interface on said destination router corresponding to the layer two virtual interface on said source router after receiving the mirroring packet, and send the mirroring packet with a label being removed from a physical port corresponding to the layer two virtual interface on said destination router to a monitoring port;
said router further comprises: a storage device;
when said router acts as the source router,
said support module is further configured to configure a port attribute list for said remote mirroring port, the port attribute list of the remote mirroring port on said source router includes a mirroring flag and an egress interface for remotely mirroring, and said egress interface is the layer two virtual interface on said remote mirroring port;

the physical egress port corresponding to the layer two virtual interface on said source router is included in the port attribute list configured for the layer two virtual interface on said source router by said support module, and the port attribute list of the layer two virtual interface on said source router further includes an Access Control List (ACL) rule number and an ID number of a VPWS tunnel;
said support module is further configured to configure a VPWS forwarding list for said VPWS tunnel on said source router, and said VPWS forwarding list includes a VPN ID of said VPWS tunnel, a source MAC, a destination MAC and inner and outer label information of said VPWS tunnel;
said support module is further configured to send the configured port attribute list of the remote mirroring port, the port attribute list of the layer two virtual interface and the VPWS forwarding list on said source router to said storage device;
said storage device is configured to receive and store the port attribute list of the remote mirroring port, the port attribute list of the layer two virtual interface and the VPWS forwarding list on said source router.

8. The router as claimed in claim 7, wherein
said transceiver module includes: a remote mirroring unit;
when said router acts as the source router,
said transceiver module is further configured to forward the data stream which requires remote mirroring returned by the access control module to the remote mirroring unit;
said transceiver module is further configured to receive said mirroring packet returned by said remote mirroring unit;
said remote mirroring unit is configured to search the port attribute list of said remote mirroring port to obtain the layer two virtual interface of the remote mirroring port of said source router after receiving the data stream which requires remote mirroring, then search the port attribute list of the layer two virtual interface on said source router, filter out the mirroring data stream according to the ACL rule in the port attribute list, obtain the source MAC, destination MAC and inner and outer label information of said VPWS tunnel according to said VPWS forwarding list, encapsulate the source MAC, destination MAC and inner and outer labels into a layer two header of said mirroring data stream, obtain said mirroring packet, and then send said mirroring packet from the physical egress port corresponding to the layer two virtual interface on said source router to said transceiver module.

9. The router as claimed in claim 7, wherein
said router further comprises: a storage device;
when said router acts as the source router,
said support module is further configured to configure a port attribute list for the layer two virtual interface on said destination router, and the port attribute list of the layer two virtual interface on said destination router includes a practical physical egress port corresponding to the layer two virtual interface on said destination router;
said support module is configured to establish a Multi protocol Label Switching (MPLS) forwarding list for a port at which the mirroring packet is received on the destination router, and said MPLS forwarding list includes an egress interface corresponding to an inner layer Virtual Circuit (VC) label, and said egress interface is the layer two virtual interface corresponding to the layer two virtual interface of the source router;

said support module is further configured to send the configured MPLS forwarding list and the port attribute list of the layer two virtual interface on said destination router to said storage device;

said storage device is further configured to receive and store the MPLS forwarding list and the port attribute list of the layer two virtual interface on said destination router.

10. The router as claimed in claim 9, wherein
said transceiver module further includes: a remote mirroring unit;
when said router acts as the destination router,
said transceiver module is further configured to receive said mirroring packet, search the MPLS forwarding list of the port at which said mirroring packet is received, obtain the egress interface corresponding to the inner layer VC label which is the layer two virtual interface on said destination router, and send said mirroring packet and layer two virtual interface information to said remote mirroring unit; and said transceiver module is further configured to receive the mirroring packet with a label being removed from said remote mirroring unit, and said mirroring packet with the label being removed is layer three packet;
said remote mirroring unit is configured to search the port attribute list of said layer two virtual interface on said destination router after receiving said mirroring packet and the layer two virtual interface information to obtain a physical egress port corresponding to the layer two virtual interface, and send the mirroring packet with the label being removed to said transceiver module.

11. The router as claimed in claim 7, wherein
when said router acts as the source router,
the remote mirroring port configured by said configuration module is an ingress port and/or an egress port of the source router.

12. The router as claimed in claim 11, wherein
when said router acts as the source router,
when the remote mirroring port of said source router is the ingress port, said transceiver module is further configured to transmit said mirroring packet back to said ingress port after sending said mirroring packet from the physical egress port corresponding to the layer two virtual interface on said source router to said destination router, and then forward said mirroring packet as common packet;
when the remote mirroring port of said source router is the egress port, said transceiver module is further configured to forward said packet as the common packet and then transmit said mirroring packet back to said egress port after the packet is received at the remote mirroring port of said source router and before filtering out the mirroring data stream.

* * * * *